US009592777B1

(12) United States Patent
Van Agen et al.

(10) Patent No.: US 9,592,777 B1
(45) Date of Patent: Mar. 14, 2017

(54) POSITIVE LOCATING GROMMET WITH NVH FLAP

(71) Applicants: Christina H Van Agen, Rochester, MI (US); Damon I Blumenstein, Commerce Township, MI (US); Thomas F Wentworth, Sterling Heights, MI (US)

(72) Inventors: Christina H Van Agen, Rochester, MI (US); Damon I Blumenstein, Commerce Township, MI (US); Thomas F Wentworth, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/953,954

(22) Filed: Nov. 30, 2015

(51) Int. Cl.
| | |
|---|---|
| *H01R 13/74* | (2006.01) |
| *F16J 15/02* | (2006.01) |
| *B60R 16/02* | (2006.01) |
| *H02G 3/22* | (2006.01) |
| *B60R 13/08* | (2006.01) |

(52) U.S. Cl.
CPC ........ *B60R 16/0222* (2013.01); *B60R 13/083* (2013.01); *H02G 3/22* (2013.01)

(58) Field of Classification Search
None
See application file for complete search history.

(56) References Cited

U.S. PATENT DOCUMENTS

| | | | |
|---|---|---|---|
| 5,201,564 | A | 4/1993 | Price |
| 6,941,714 | B2 | 9/2005 | Nakamura |
| 7,641,271 | B1 | 1/2010 | Haydin et al. |
| 8,314,337 | B2 | 11/2012 | Fujita |
| 2002/0138942 | A1 | 10/2002 | Sato et al. |
| 2011/0011625 | A1 | 1/2011 | Okuhara et al. |
| 2011/0198110 | A1 | 8/2011 | Fujita |
| 2015/0035319 | A1* | 2/2015 | Fabricatore ......... B60R 16/0222 296/193.07 |

FOREIGN PATENT DOCUMENTS

EP        2360063 A1    8/2011

\* cited by examiner

*Primary Examiner* — Dimary Lopez Cruz
(74) *Attorney, Agent, or Firm* — Ralph E. Smith

(57) ABSTRACT

A grommet configured to pass through a vehicle wall and an acoustic mat is provided. The grommet includes first and second sealing segments, a mounting segment, and a pass-through segment. A flange configured to abut the vehicle wall extends from the first sealing segment. The pass-through segment has a NVH flap that is configured to abut the acoustic mat. The grommet has a grommet installation coupling that includes a mounting hole in the flange for receiving a mounting stud that extends from the vehicle wall and an engagement member that engages the mounting stud. The engagement member applies an installation force to the flange, which moves the grommet longitudinally from a first installation position to a second installation position and pushes the NVH flap against the acoustic mat so that the NVH flap is deflected back toward the flange as the grommet moves to the second installation position.

20 Claims, 6 Drawing Sheets

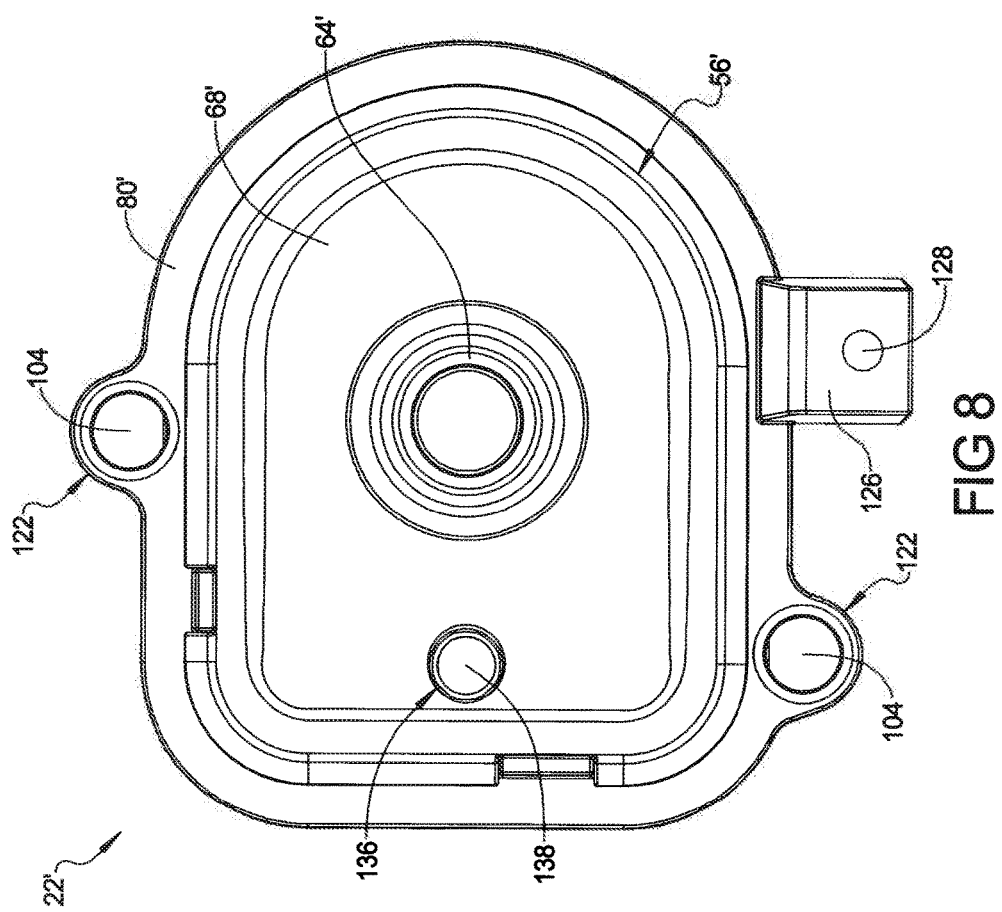

POSITIVE LOCATING GROMMET WITH NVH FLAP

FIELD

The subject disclosure relates to pass-through grommet assemblies for installation in a vehicle and more particularly to a grommet defining a pass-through in a vehicle wall and an acoustic mat that covers at least a portion of the vehicle wall.

BACKGROUND

This section provides background information related to the present disclosure and is not necessarily prior art.

In an effort to quiet vehicle interiors, vehicles such as automobiles are commonly equipped with acoustic mats placed along one or more walls of the vehicle. Acoustic mats are constructed of materials that absorb noise and vibration and/or materials that block the transmission of noise and vibration through the acoustic mat. While such acoustic mats perform well over uninterrupted areas of a vehicle wall, acoustic performance is drastically reduced in areas where electrical wiring harnesses or other penetrating components pass-through openings in the vehicle wall and thus the acoustic mat. Such openings are prolific in most vehicle firewalls, which are typically a sheet metal wall disposed between an engine compartment and a passenger compartment of a vehicle. Wall openings pose additional problems because water and dust can travel through these spaces. Chaffing of the electrical wiring harness or other penetrating components can also occur in the vicinity of wall openings. Accordingly, grommets are commonly used where electrical wiring harnesses or other penetrating components pass-through the openings in a vehicle wall.

Grommets typically include an annular groove or channel that is disposed along an outer circumference of the grommet. This annular channel or recess either engages the sheet metal surrounding the wall opening or portions of the acoustic mat adjacent the wall opening. For example, U.S. Pat. No. 8,314,337 which issued to Fujita on Nov. 20, 2012 discloses an electrical wiring grommet that includes an annular groove for engaging the sheet metal surrounding a through hole in a vehicle body. In another example, U.S. Pat. No. 6,941,714 which issued to Nakamura on Sep. 13, 2005 discloses an electrical wiring grommet that includes an annular groove for engaging one of the layers of an acoustic mat. Such grommets can be problematic because they are prone to faulty installation.

Typically, grommets are installed by hand, where an installer pushes part of the grommet through the appropriate opening or hole in the vehicle wall and/or acoustic mat. The installer is supposed to continue pushing the grommet through the opening until the sheet metal surrounding the opening in the wall is received in the annular groove or until a layer of the acoustic mat is received in the annular groove. Oftentimes however, the installer does not fully install the grommet either due to inattention or because it is difficult to determine whether or not proper seating has occurred. In the later instance, the grommet may be located in an area where access is limited, making visual inspection difficult. Also, the arrangement of the annular groove or channel may not provide significant tactile feedback to the installer to indicate that the grommet has been properly installed. This is particularly common where the acoustic mat or portions thereof locks into the annular groove in the grommet because acoustic mats are often flexible themselves, making installation of the grommet more difficult. Ultimately, poorly installed grommets have poor acoustic performance, can provide leak pathways for water and dust, and are prone to fall away from the opening completely during the service life of the vehicle.

SUMMARY

This section provides a general summary of the disclosure, and is not a comprehensive disclosure of its full scope or all of its features.

A grommet is disclosed herein. It should be appreciated that the grommet is configured to pass through both a vehicle wall and an acoustic mat that covers at least a portion of the vehicle wall. Together, the grommet, the vehicle wall, and the acoustic mat form a pass-through grommet assembly. The grommet generally includes first and second sealing segments, a mounting segment, and a pass-through segment. The first and second sealing segments are longitudinally spaced apart from one another. The mounting segment includes a flange that extends from the first sealing segment. The pass-through segment has a first end disposed adjacent to the flange of the mounting segment and a second end that is disposed adjacent to the second sealing segment. The grommet includes an internal cavity that extends through the first and second sealing segments, the mounting segment, and the pass-through segment. The internal cavity has a longitudinal axis. The pass-through segment further includes a NVH flap that extends from the second end of the pass-through segment. The flange of the mounting segment has a wall-side face that is configured to abut the vehicle wall and the NVH flap of the pass-through segment is configured to abut the acoustic mat. The grommet also includes a grommet installation coupling. The grommet installation coupling includes one or more mounting holes disposed in the flange that receive one or more mounting studs that extend from the vehicle wall. The grommet installation coupling also includes one or more engagement members that engage the one or more mounting studs. The one or more engagement members apply an installation force to the flange that moves the grommet longitudinally from a first installation position to a second installation position and pushes the NVH flap against the acoustic mat. As a result of the installation force that is applied by the one or more engagement members, the NVH flap is deflected back toward the flange of the mounting segment as the grommet moves to the second installation position.

Advantageously, the grommet installation coupling positions and positively locates the grommet and the NVH flap during installation. The locations of the one or more mounting studs on the vehicle wall and the locations of the one or more mounting holes in the flange are such that the pass-through segment of the grommet is aligned with a wall opening when the one or more mounting studs are received in the one or more mounting holes. This helps positively locate the grommet with respect to the wall opening making installation easier. In addition, engagement of the one or more engagement members with the one or more mounting studs pushes the NVH flap against the barrier layer forcing the NVH flap back to a specific orientation as the grommet is advanced to the second installation position. Because the NVH flap is bent/folded back in the second installation position, the NVH flap maintains a tight seal against the acoustic mat, which reduces noise and vibration transmission through the grommet. When the grommet reaches the second installation position, movement of the grommet stops and further engagement of the one or more engagement members becomes difficult because the flange has moved into contact with the vehicle wall. This provides the added benefit of making it easier for an installer to accurately determine whether the grommet has been fully installed and advanced to the second installation position.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 8 is a front elevation view of the grommet illustrated in FIG. 6.

DETAILED DESCRIPTION

Figure 1:
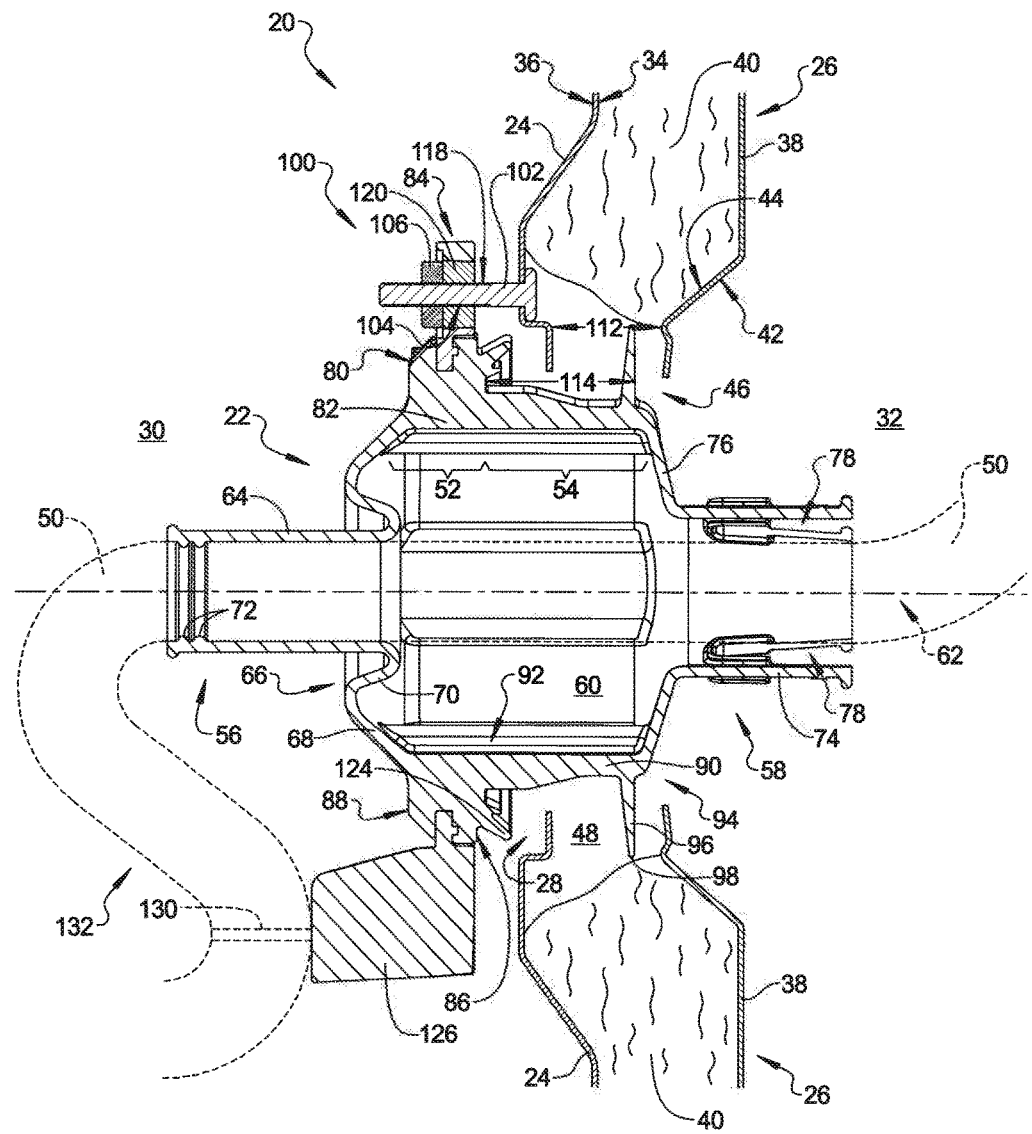
FIG. 1 is a cross-sectional view of an exemplary pass-through grommet assembly that has been constructed in accordance with the subject disclosure where a grommet of the exemplary pass-through grommet assembly is illustrated in a first installation position.

Referring to the Figures, wherein like numerals indicate corresponding parts throughout the several views, a pass-through grommet assembly 20 for installation in a vehicle is disclosed.

Example embodiments are provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known component structures, well-known assemblies, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the component or assembly in use or operation in addition to the orientation depicted in the figures. For example, if the component or assembly in the figures is turned over, elements described as "below" or "beneath" other elements or features would then be oriented "above" the other elements or features. Thus, the example term "below" can encompass both an orientation of above and below. The components and assemblies described herein may be otherwise oriented (rotated 90 degrees or at other orientations) and the spatially relative descriptors used herein interpreted accordingly. In addition, the term "substantially parallel" is used herein to describe elements that are generally aligned with one another plus or minus 10 degrees and the term "substantially transverse" is used herein to describe elements that are generally perpendicular to one another plus or minus 10 degrees.

Figure 2:
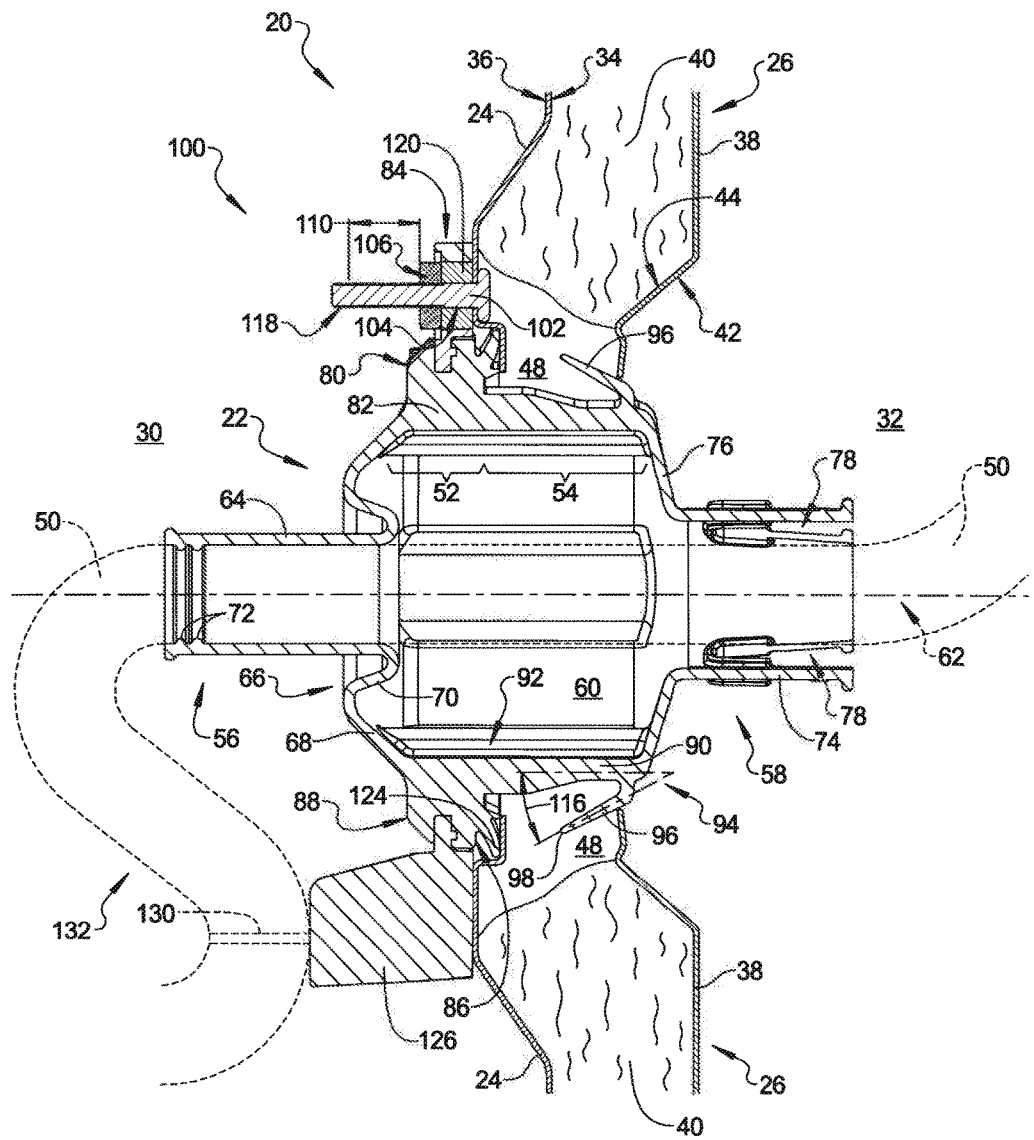
FIG. 2 is another cross-sectional view of the exemplary pass-through grommet assembly shown in FIG. 1 where the grommet is illustrated in a second installation position.

As shown in FIGS. 1-2, the pass-through grommet assembly 20 includes a grommet 22 that passes through a vehicle wall 24 and an acoustic mat 26. The vehicle wall 24 defines a wall opening 28 therein. The wall opening 28 passes completely through the vehicle wall 24 and has a wall opening cross-sectional area. It should be appreciated that the wall opening 28 may have a variety of different shapes, including without limitation, a circular shape or a D-shape. In configurations where the wall opening 28 has a circular cross-section, the wall opening 28 has a wall opening diameter. It should also be appreciated that the vehicle wall 24 could be any wall of a vehicle. By way of non-limiting example, the vehicle wall 24 may be a firewall in an automobile, truck, or other vehicle that is disposed between an engine compartment 30 and a passenger compartment 32 of the vehicle. The vehicle wall 24 has an interior side 34 and an exterior side 36. In configurations where the vehicle wall 24 is a firewall, the interior side 34 of the vehicle wall 24 faces the passenger compartment 32 of the vehicle and the exterior side 36 of the vehicle wall 24 faces the engine compartment 30 of the vehicle. It should be understood that the vehicle wall 24 may be made of a wide variety of different materials, including without limitation, sheet metal, carbon fiber, fiberglass, or thermoplastic.

The acoustic mat 26 is disposed along and at least partially covers the interior side 34 of the vehicle wall 24. As such, the acoustic mat 26 is positioned between the vehicle wall 24 and the passenger compartment 32 of the vehicle. Although not shown, the acoustic mat 26 may alternatively be placed along the exterior side 36 of the vehicle wall 24 in certain applications. The acoustic mat 26 generally functions to block and/or dampen noise and vibration so that the passenger compartment 32 of the vehicle is quieter and therefore more comfortable for vehicle occupants. By way of example and without limitation, the acoustic mat 26 may be a dash silencer. The acoustic mat 26 may directly abut the vehicle wall 24, may be spaced from the vehicle wall 24 by a void or by one or more intervening elements, or may be a combination of these depending on the specific location along the vehicle wall 24. Various different constructions of the acoustic mat 26 are possible. In one non-limiting example, the acoustic mat 26 includes a barrier layer 38 and a decoupler layer 40. In accordance with this configuration, which is illustrated in FIGS. 1 and 2, the barrier layer 38 is disposed adjacent the passenger compartment 32 of the vehicle and the decoupler layer 40 is disposed between the barrier layer 38 and interior side 34 of the vehicle wall 24. Although the materials may vary, the barrier layer 38 may be made from sheets of polypropylene, polyvinylchloride, polyethylene, ethylene vinyl acetate, latex, or other thermoplastic materials and the decoupler layer 40 may be made of polyester fiber, cotton, fiberglass, foam, microfibers, micro denier rider, polypropylene (PP), polyethylene terephthalate (PET), and/or a combination of these materials. Sometimes the material of the decoupler layer 40 may be referred to as shoddy due to its random, non-woven structure.

Still referring to FIGS. 1 and 2, the barrier layer 38 of the acoustic mat 26 has an inside surface 42 that faces the passenger compartment 32 of the vehicle and a wall-side surface 44 that faces the interior side 34 of the vehicle wall 24. The barrier layer 38 of the acoustic mat 26 has a barrier layer opening 46 therein and the decoupler layer 40 of the acoustic mat 26 has a decoupler layer opening 48 therein. The barrier layer opening 46 may generally be aligned with the decoupler layer opening 48 and both the barrier layer and decoupler layer openings 46, 48 may generally be aligned with the wall opening 28. It should generally be understood that in typical vehicles, multiple elements pass through the vehicle walls and that one such pass-through is illustrated in FIGS. 1 and 2. In the example illustrated, an electrical wiring harness 50 of the vehicle passes through the wall opening 28; however, other components may pass through the wall opening 28 instead, including without limitation, a steering column, brake and accelerator linkages, shift linkages, and heating and cooling system ducting. The electrical wiring harness 50 passes through the grommet 22 such that the grommet 22 is positioned between the vehicle wall 24 and the electrical wiring harness 50. In other words, the grommet 22 may surround the electrical wiring harness 50 and centrally position the electrical wiring harness 50 within the wall opening 28. As a result, the grommet 22 may perform a variety of different functions. For example, the grommet 22 may help prevent the electrical wiring harness 50 from rubbing against the vehicle wall 24 and becoming damaged, the grommet 22 may provide a seal that prevents water and/or dust from passing through the wall opening 28, and/or the grommet 22 may reduce the amount of noise and vibration that is transmitted through the wall opening 28.

Figure 3:
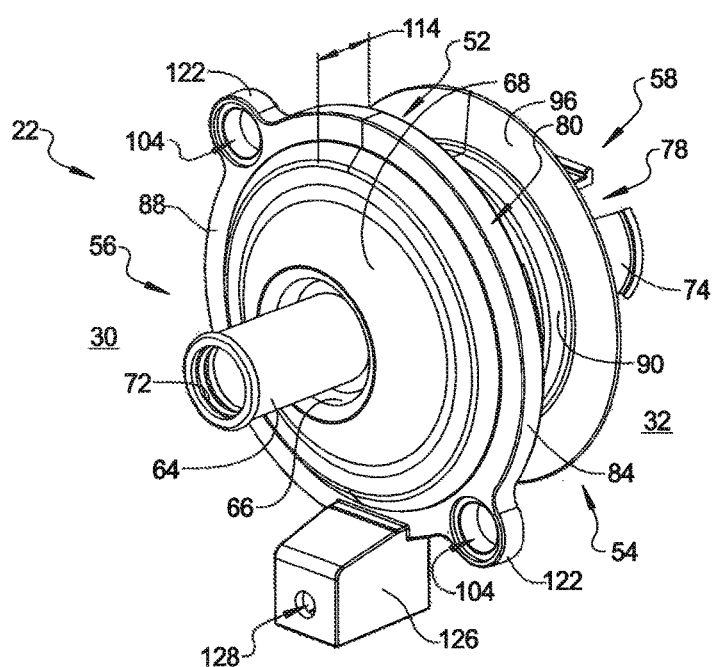
FIG. 3 is a front perspective view of the grommet of the exemplary pass-through grommet assembly illustrated in FIG. 1 where the grommet shown has a circular cross-section.
Figure 4:
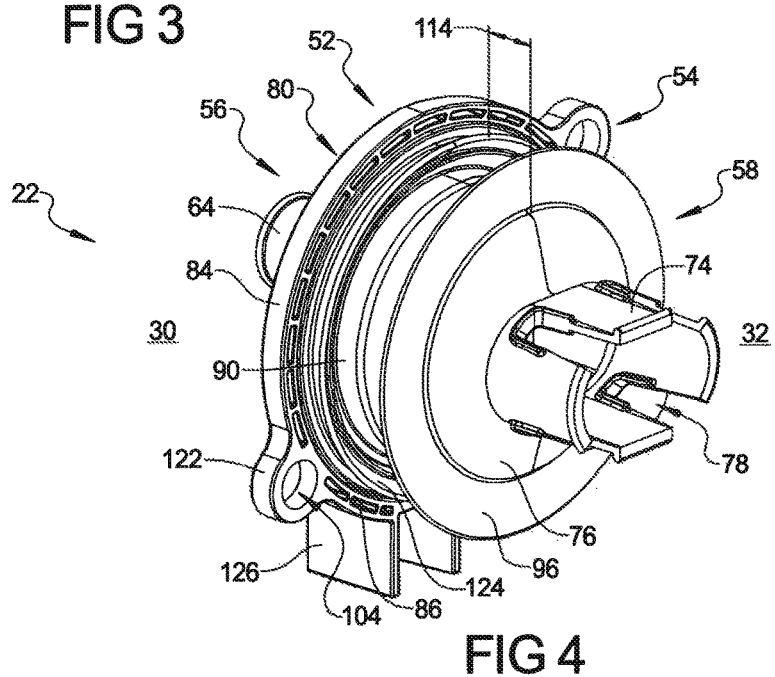
FIG. 4 is a rear perspective view of the grommet illustrated in FIG. 3.
Figure 5:
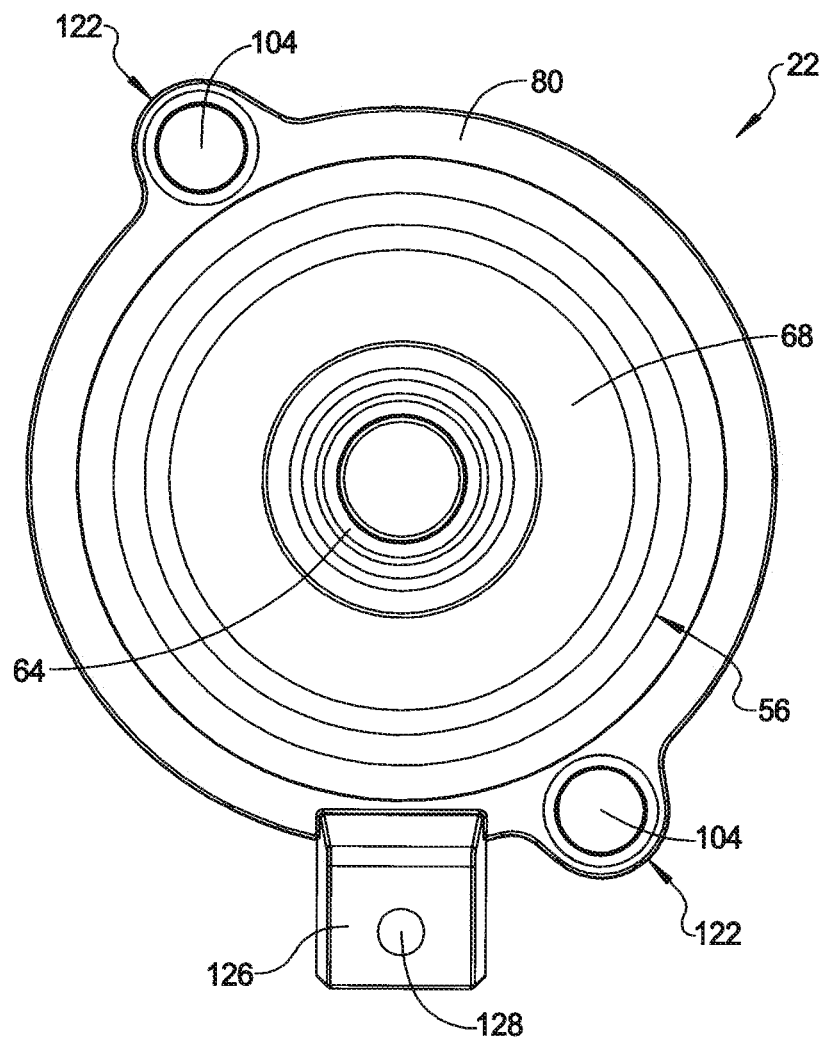
FIG. 5 is a front elevation view of the grommet illustrated in FIG. 3.
Figure 6:
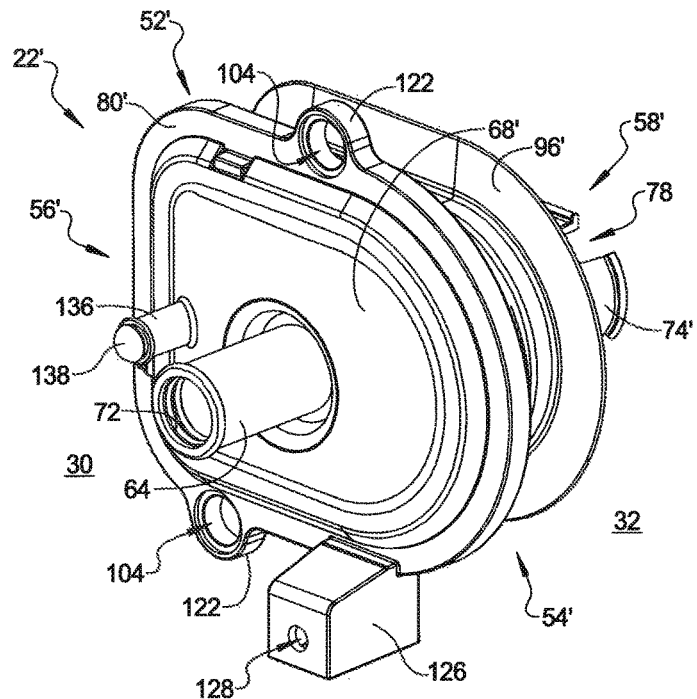
FIG. 6 is a front perspective view of the grommet of the exemplary pass-through grommet assembly illustrated in FIG. 1 where the grommet shown has a D-shaped cross-section.
Figure 7:
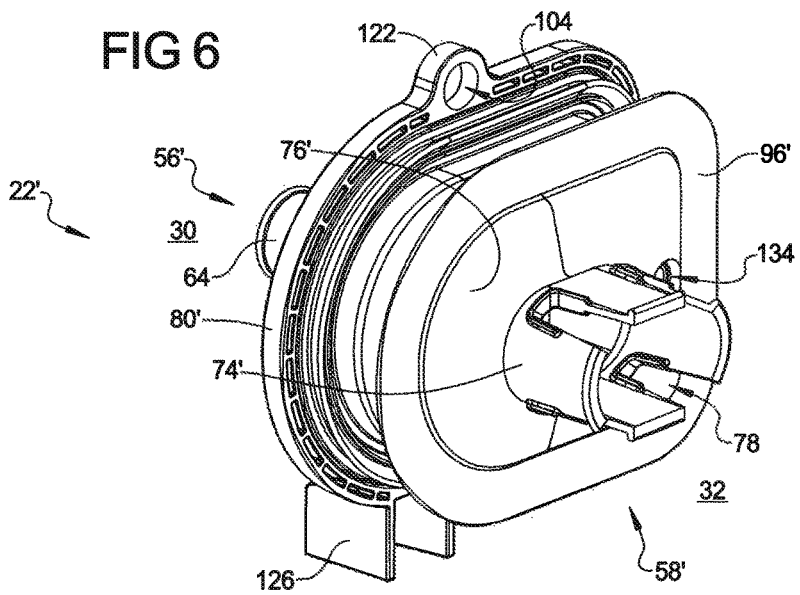
FIG. 7 is a rear perspective view of the grommet illustrated in FIG. 6.

The size and shape of the barrier layer opening 46, the decoupler layer opening 48, and the grommet 22 may be tailored to the size and shape of the wall opening 28 and the electrical wiring harness 50 (or whatever other element of the vehicle is passing through the wall opening 28). By way of example and without limitation, the barrier layer opening 46 and the decoupler layer opening 48 may have a circular shape or a D-shape. The grommet 22 may generally have a cross-sectional shape that mimics the shape of the wall opening 28, the barrier layer opening 46, and/or the decoupler layer opening 48. FIGS. 1-2 generically show cross-sectional views of the grommet 22, FIGS. 3-5 show the grommet 22 with a generally circular cross-section, and FIGS. 6-8 show the grommet 22 with a generally D-shaped cross-section. Notwithstanding, other grommet shapes and configurations are possible and are considered within the scope of the subject disclosure. The barrier layer opening 46 has a minor cross-sectional area and the decoupler layer opening 48 has a major cross-sectional area. The major cross-sectional area of the decoupler layer opening 48 is larger than the minor cross-sectional area of the barrier layer opening 46 and the minor cross-sectional area of the barrier layer opening 46 may be smaller than the wall opening cross-sectional area. In configurations where the wall opening 28 and thus the grommet 22 are circular in shape, the barrier layer opening 46 has a minor diameter and the decoupler layer opening 48 has a major diameter. The major diameter of decoupler layer opening 48 is larger than the minor diameter of the barrier layer opening 46 and the minor diameter of the barrier layer opening 46 may be smaller than the wall opening diameter. In other words, the barrier layer opening 46 is smaller than the decoupler layer opening 48 and may also be smaller than the wall opening 28.

With continued reference to FIG. 1-2 and with additional reference to FIGS. 3-5, the grommet 22 includes a mounting segment 52, a pass-through segment 54, a first sealing segment 56, and a second sealing segment 58. The first and second sealing segments 56, 58 are longitudinally spaced apart, the mounting segment 52 is disposed adjacent the first sealing segment 56, and the pass-through segment 54 extends between the mounting segment 52 and the second sealing segment 58. As best seen in FIGS. 1 and 2, the grommet 22 has an internal cavity 60 that extends through the mounting segment 52, the pass-through segment 54, the first sealing segment 56, and the second sealing segment 58 of grommet 22. The internal cavity 60 of the grommet 22 has a longitudinal axis 62 and the internal cavity 60 is sized and shaped to receive the electrical wiring harness 50. Thus, it should be appreciated that the term "longitudinally" is used herein to describe elements that are oriented or that extend in a direction that is substantially parallel to the longitudinal axis 62.

The first sealing segment 56 of the grommet 22 includes a tubular boot 64 and a folded portion 66 that connects the tubular boot 64 to the mounting segment 52. More specifically, the folded portion 66 extends between the tubular boot 64 and the mounting segment 52. The folded portion 66 of the first sealing segment 56 has a domed wall 68 that has an S-shaped cross-section 70 (shown in FIGS. 1 and 2) where the domed wall 68 transitions to the tubular boot 64. The tubular boot 64 of the first sealing segment 56 extends longitudinally from the domed wall 68 and into the engine compartment 30 of the vehicle. The tubular boot 64 includes one or more internal ribs 72 that seal against the electrical wiring harness 50. The tubular boot 64 of the first sealing segment 56 has a first cross-sectional area. In configurations where the tubular boot 64 is cylindrical (FIGS. 3-8), the tubular boot 64 also has a first diameter. The second sealing segment 58 of the grommet 22 includes a wire tape tab 74 and a transitional wall 76 that connects the wire tape tab 74 to the pass-through segment 54. More specifically, the transitional wall 76 extends between the wire tape tab 74 and the pass-through segment 54. The wire tape tab 74 of the second sealing segment 58 extends longitudinally from the transitional wall 76 and into the passenger compartment 32 of the vehicle. The wire tape tab 74 of the second sealing segment 58 is segmented by a plurality of slits 78 that allow the wire tape tab 74 to close tightly on and seal against the electrical wiring harness 50 when electrical tape, a plastic clamp, a wire tie (i.e. a zip-tie), or similar structure is positioned about the wire tape tab 74 and pulled tight. The wire tape tab 74 has a second cross-sectional area that may be larger than the first cross-sectional area of the tubular boot 64 of the first sealing segment 56. In configurations where the wire tape tab 74 is generally cylindrical (FIGS. 3-5), the wire tape tab 74 has a second diameter that may be larger than the first diameter of the tubular boot 64 of the first sealing segment 56.

With reference to FIGS. 1-5, the mounting segment 52 of the grommet 22 includes a flange 80 that extends in a direction that is substantially transverse to the longitudinal axis 62. By way of non-limiting example, the flange 80 of the mounting segment 52 may be arranged at a 90 degree angle relative to the longitudinal axis 62. The flange 80 has a base 82 that gives the mounting segment 52 an inner cross-sectional area and a periphery 84 that gives the mounting segment 52 an outer cross-sectional area. The outer cross-sectional area of the periphery 84 of the flange 80 is larger than the inner cross-sectional area of the base 82 of the flange 80. Additionally, the outer cross-sectional area of the periphery 84 of the flange 80 is larger than the wall opening cross-sectional area. Accordingly, the flange 80 is large enough to come into contact with the vehicle wall 24 in an abutting relationship when the second sealing segment 58 and the pass-through segment 54 of the grommet 22 are advanced through the wall opening 28 during grommet installation (FIGS. 1 and 2). In configurations where the mounting segment 52 is circular in cross-section (FIGS. 3-5), the flange 80 may also be generally circular in shape such that the flange 80 has an outer diameter and an inner diameter. The outer diameter of the flange 80 is larger than both the inner diameter of the flange 80 and the wall opening 28 diameter. The flange 80 also has a wall-side face 86 and an opposite face 88 that opposes the wall-side face 86, each being substantially transverse to the longitudinal axis 62. The wall-side face 86 of the flange 80 faces the exterior side 36 of the vehicle wall 24 and the opposite face 88 of the flange 80 faces the engine compartment 30 of the vehicle.

The pass-through segment 54 of the grommet 22 includes an intermediate wall 90 that extends from the base 82 of the flange 80 of the mounting segment 52 to the transitional wall 76 of the second sealing segment 58. The pass-through segment 54 has a first end 92 disposed adjacent to the flange 80 of the mounting segment 52 and a second end 94 disposed adjacent to the transitional wall 76 of the second sealing segment 58. As best seen in FIGS. 1 and 2, the intermediate wall 90 may extend in a direction that is substantially parallel to the longitudinal axis 62 and may taper in thickness such that the intermediate wall 90 is thinner at the second end 94 of the pass-through segment 54 than it is at the first end 92 of the pass-through segment 54. At the second end 94, the pass-through segment 54 has a third cross-sectional area. The third cross-sectional area of the pass-through segment 54 is smaller than the wall opening cross-sectional area and the minor cross-sectional area of the barrier layer opening 46. As such, the second end 94 of the pass-through segment 54 is smaller than the wall opening 28, the decoupler layer opening 48, and the barrier layer opening 46 and therefore can extend through the wall opening 28, the decoupler layer opening 48, and the barrier layer opening 46 during grommet installation (FIG. 2). In configurations where the intermediate wall 90 tapers in thickness, the third cross-sectional area of the pass-through segment 54 may also be smaller than the inner cross-sectional area of the mounting segment 52. In configurations where the pass-through segment 54 is circular in cross-section (FIGS. 3-5), the pass-through segment 54 has a third diameter at the second end 94. The third diameter of the pass-through segment 54 may be smaller than the wall opening diameter, the minor diameter of the barrier layer opening 46, and the inner diameter of the mounting segment 52.

Still referring to FIGS. 1-5, the pass-through segment 54 of the grommet 22 includes a NVH flap 96 that extends outwardly from the second end 94 of the pass-through segment 54. The NVH flap 96, which stands for "Noise, Vibration and Harshness flap," extends from the intermediate wall 90 of the pass-through segment 54 to an outer edge 98 that defines a flap cross-sectional area. The flap cross-sectional area is larger than the minor cross-sectional area of the barrier layer opening 46. This means that the NVH flap 96 is sized to contact the wall-side surface 44 of the barrier layer 38 when the second end 94 of the pass-through segment 54 is advanced through the barrier layer opening 46 during grommet installation (FIG. 2). Optionally, the flap cross-sectional area may be smaller than the major cross-sectional area of the decoupler layer opening 48 such that the decoupler layer 40 does not contact or otherwise interfere with the NVH flap 96 as the second end 94 of the pass-through segment 54 is advanced through the decoupler layer opening 48 and toward the barrier layer opening 46 during grommet installation (FIG. 1). In configurations where the NVH flap 96 is circular in cross-section (FIGS. 3-5), the NVH flap 96 may have a flap diameter that is larger than the minor diameter of the barrier layer opening 46 and smaller than the major diameter of the decoupler layer opening 48.

As best seen in FIGS. 1 and 2, the pass-through grommet assembly 20 further includes a grommet installation coupling 100 that positions and positively locates the grommet 22 and the NVH flap 96 during installation and retains the grommet 22 in the wall opening 28 of the vehicle wall 24. The grommet installation coupling 100 includes one or more mounting studs 102 that extend outwardly from the vehicle wall 24, one or more mounting holes 104 disposed in the flange 80 that receive the mounting studs 102, and one or more engagement members 106 that engage the mounting studs 102. The mounting studs 102 may more specifically extend outwardly from the exterior side 36 of the vehicle wall 24 and into the engine compartment 30 of the vehicle in a direction that is substantially parallel to the longitudinal axis 62 and that is substantially transverse to the vehicle wall 24. The mounting studs 102 are generally disposed at spaced locations adjacent the wall opening 28. Although the cross-sectional views in FIGS. 1 and 2 illustrate only one of the mounting studs 102, the illustrated examples include two mounting studs 102, each being received in the two mounting holes 104 shown in FIGS. 3-8. Notwithstanding, it should be appreciated that any number of mounting studs 102 and mounting holes 104 may be used, including only one of each.

During installation of the grommet 22, the grommet 22 is positioned (e.g. by hand or by machine) such that the mounting holes 104 receive the mounting studs 102 (FIG. 1). The locations of the mounting studs 102 relative to the wall opening 28 and the locations of the mounting holes 104 relative to the flange 80 are such that at least the pass-through segment 54 of the grommet 22 is aligned with the wall opening 28 when the mounting studs 102 are received in the mounting holes 104. As shown in FIG. 2, the engagement members 106 operate to apply an installation force 108 to the opposite face 88 of the flange 80. The installation force 108 operates in a direction that is substantially parallel to the longitudinal axis 62. In response to the application of the installation force 108 on the flange 80, the grommet 22 moves longitudinally relative to the vehicle wall 24 and the acoustic mat 26 from a first installation position to a second installation position. In FIG. 1, the grommet 22 is shown in the first installation position, where the mounting studs 102 are received in the mounting holes 104 and the wall-side face 86 of the flange 80 is longitudinally spaced from the exterior side 36 of the vehicle wall 24. In FIG. 2, the grommet 22 is shown in the second installation position, where the mounting studs 102 extend through the mounting holes 104 and the wall-side face 86 of the flange 80 abuts the exterior side 36 of the vehicle wall 24.

The first installation position and the second installation position are spaced apart from one another by a predetermined travel distance 110 that is also substantially parallel to the longitudinal axis 62. As the grommet 22 moves from the first installation position to the second installation position, the NVH flap 96 is pushed against the wall-side surface 44 of the barrier layer 38 such that the NVH flap 96 deflects back toward the flange 80. In configurations where the NVH flap 96 is circular in cross-section (FIGS. 3-5), the NVH flap 96 has a relatively flat, disc like shape when the grommet 22 is located in the first installation position (FIG. 1) and has a cone-like shape when the grommet 22 is advanced to the second installation position (FIG. 2). It should be appreciated that the amount of deflection of the NVH flap 96 depends on how far the second end 94 of the pass-through segment 54 is advanced through the barrier layer opening 46. This variable is controlled by the arrangement of the mounting studs 102, the mounting holes 104, and the engagement members 106 of the grommet installation coupling 100. In other words, engagement of the engagement members 106 on the mounting studs 102 pushes/folds the NVH flap 96 back to a specific orientation in the second installation position and subsequently holds the grommet 22 in place in the second installation position.

With reference to FIG. 1, the exterior side 36 of the vehicle wall 24 and the wall-side surface 44 of the acoustic mat 26 are longitudinally spaced by a first predetermined distance 112 that extends in a direction that is substantially parallel to the longitudinal axis 62 at a location adjacent to the wall opening 28. As shown in FIGS. 1, 3 and 4, the wall-side face 86 of the flange 80 and the NVH flap 96 are spaced apart by a second predetermined distance 114. The second predetermined distance 114 also extends in a direction that is substantially parallel to the longitudinal axis 62 and the second predetermined distance 114 is greater than the first predetermined distance 112. In other words, the wall-side face 86 of the flange 80 and the NVH flap 96 are spaced further apart than the spacing between the exterior side 36 of the vehicle wall 24 and the wall-side surface 44 of the acoustic mat 26 at a location adjacent to the wall opening 28. Because the second predetermined distance 114 is greater than the first determined distance, the NVH flap 96 is substantially perpendicular to the longitudinal axis 62 when the grommet 22 is located in the first installation position (FIG. 1) and is pushed back toward the flange 80 at a predetermined acute angle 116 when the grommet 22 advances to the second installation position (FIG. 2). For example and without limitation, the NVH flap 96 may be pushed back to where the predetermined acute angle 116 is a value within the range of 25 degrees to 75 degrees, said range including the values of 25 degrees and 75 degrees. The NVH flap 96 may be made of a resilient material such that the NVH flap 96 can deflect without breaking, can apply a sealing force against the barrier layer 38 when deflected, and can return to its initial position if the grommet 22 is moved from the second installation position to the first installation position. Advantageously, because the NVH flap 96 is maintained at the predetermined acute angle 116 after the grommet 22 is moved to the second installation position (FIG. 2), the NVH flap 96 remains in tight contact with the barrier layer opening 46 and therefore provides a good acoustic seal that minimizes noise and vibration transmission through the grommet 22.

The engagement members 106 of the grommet installation coupling 100 provide positive feedback that the grommet 22 has reached the second installation position and the NVH flap 96 has bent back to the predetermined acute angle 116 because movement of the grommet 22 stops and further engagement of the engagement members 106 becomes difficult once the wall-side face 86 of the flange 80 contacts the exterior side 36 of the vehicle wall 24. This makes it easier for an installer to determine whether the grommet 22 has been fully installed and advanced to the second installation position (shown in FIG. 2) because all that the installer needs to do is check the torque on the engagement members 106. The mounting studs 102 and the engagement members 106 may come in a variety of different sizes, shapes, and configurations. By way of example and without limitation, the mounting stud 102 illustrated in FIGS. 1 and 2 is welded to and extends from the exterior side 36 of the vehicle wall 24 and has a threaded portion 118. The engagement member 106 illustrated in FIGS. 1 and 2 is a nut that is threadably received on the threaded portion 118 of the mounting stud 102. The mounting hole 104 illustrated in FIGS. 1 and 2 is defined by a ferrule 120 that is disposed within the flange 80 of the mounting segment 52 of the grommet 22. The ferrule 120, which extends through the flange 80 from the wall-side face 86 of the flange 80 to the opposite face 88 of the flange 80, may be made of metal and may generally have a top hat-like shape. During grommet installation, the engagement member 106 shown in FIGS. 1 and 2 is threaded onto the threaded portion 118 of the mounting stud 102 and is tightened down until the wall-side face 86 of the flange 80 contacts the exterior side 36 of the vehicle wall 24, indicating that the second installation position has been reached. The ferrule 120 provides additional structural support to the flange 80 and prevents the engagement member 106 from crushing the flange 80 as the engagement member 106 is tightened.

As best seen in FIGS. 3-5, the flange 80 may include one or more outward bulges 122 where the mounting holes 104 pass through the flange 80. Notwithstanding these outward bulges 122, the flange 80 may otherwise have a circular cross-section (FIGS. 3-5) or a D-shape cross-section (FIGS. 6-8). With reference to FIGS. 1, 2, and 4, the mounting segment 52 of the grommet 22 may further include a sealing lip 124 that extends outwardly from the wall-side face 86 of the flange 80 toward the NVH flap 96. When the grommet 22 is advanced to the second installation position, the sealing lip 124 contacts the exterior side 36 of the vehicle wall 24 around the wall opening 28. The sealing lip 124 may be made of a resilient material so that it deforms and seals against the exterior side 36 of the vehicle wall 24 to further minimize the leakage of noise, vibration, water, and dust, through the wall opening 28.

Referring to FIGS. 1-5, the mounting segment 52 of the grommet 22 may optionally include a wire tie mount 126 that is disposed on and extends from the flange 80. As best seen in FIGS. 3 and 5, the wire tie mount 126 includes a wire tie hole 128 or similar structure that receives a wire tie 130 (shown in FIGS. 1 and 2). The wire tie 130 may be, for example and without limitation, a zip-tie. As shown in FIGS. 1 and 2, the wire tie mount 126 is positioned below the tubular boot 64 of the first sealing segment 56 when the grommet 22 is installed, including when the grommet 22 is in the second installation position. The wire tie 130 extends around the electrical wiring harness 50 and retains the electrical wiring harness 50 to the wire tie mount 126 such that the electrical wiring harness 50 forms a drip loop 132 after exiting the tubular boot 64 of the first sealing segment 56. The drip loop 132 helps prevent water incursion into the tubular boot 64 of the first sealing segment 56 of the grommet 22 because water will tend to run down along the electrical wiring harness 50 toward the drip loop 132 and away from the tubular boot 64.

As noted throughout this disclosed, the grommet 22 may have a variety of different cross-sectional shapes. In FIGS. 3-5, the first and second sealing segments 56, 58, the mounting segment 52, and the pass-through segment 54 of the grommet 22 all have generally circular cross-sections. As such, the flange 80 and the NVH flap 96 generally extend radially outwardly relative to the intermediate wall 90, which is annular in shape. With reference to FIGS. 6-8, another configuration of the grommet 22' is illustrated where the first and second sealing segments 56', 58', the mounting segment 52', and the pass-through segment 54' of the grommet 22' all have generally D-shaped cross-sections. In this configuration, the first cross-sectional area of the tubular boot 64 of the first sealing segment 56' still has a circular shape. However, the second cross-sectional area of the wire tape tab 74' of the second sealing segment 58', the inner cross-sectional area and the outer cross-sectional area of the flange 80' of the mounting segment 52', and the third cross-sectional area of the pass-through segment 54' all have a D-like shape (i.e. have a curved or arcuate side extending between opposite corners of a flat side).

The grommet 22' shown in FIGS. 6-8 also includes a secondary pass-through 134. The secondary pass-through 134 is open to the transitional wall 76' of the second sealing segment 58', extends through the pass-through segment 54', and extends into a nipple 136 that is formed in the domed wall 68' of the first sealing segment 56'. The nipple 136 extends longitudinally outwardly from the domed wall 68' into the engine compartment 30 of the vehicle and terminates at a closed end 138. The closed end 138 of the nipple 136 is configured to be cut off when utilization of the secondary pass-through 134 is desired. By way of non-limiting example, the vehicle may include optional features or aftermarket features that require another electrical wiring harness (not shown) or another penetrating member (not shown) to pass-through the wall opening 28 at a position that is spaced from and substantially parallel to the tubular boot 64 of the first sealing segment 56' and the wire tape tab 74' of the second sealing segment 58'. Though optional, the secondary pass-through 134 increases the flexibility of the grommet 22' and allows the grommet 22' to be used in a wider variety of applications. Finally, it should be noted that the secondary pass-through 134 is not intended to be limited to the geometry of the grommet 22' shown in FIGS. 6-8 and the secondary pass-through 134 could also be included in the grommet 22 shown in FIGS. 3-5.

It should be appreciated that the grommets 22, 22' disclosed herein may be constructed in a number of different ways without departing from the scope of the subject disclosure. The first and second sealing segments 56, 58, 56', 58', the mounting segments 52, 52', the pass-through segments 54, 54', and components thereof may be separately formed and then joined later on, may be integral with one another, or may be combinations of separately formed and integral components. By way of example and without limitation, the pass-through segments 54, 54' of the grommets 22, 22' including the NVH flaps 96, 96', the first sealing segments 56, 56' and the second sealing segments 58, 58' may be made of a resilient material such a rubber, latex, or similar materials. By way of example and without limitation, the flanges 80, 80' of the mounting segments 52, 52' of the grommets 22, 22' may be made of a thermoplastic material that is stiffer than the resilient material. Of course many other materials may be used besides those listed here without departing from the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A grommet for defining a pass-through in a vehicle wall and an acoustic mat that covers at least a portion of the vehicle wall, said grommet comprising:

first and second sealing segments that are longitudinally spaced apart from one another;

a mounting segment including a flange extending from said first sealing segment, said flange having a wall-side face that is configured to abut the vehicle wall;

a pass-through segment having a first end disposed adjacent to said flange and a second end that is disposed adjacent to said second sealing segment;

an internal cavity that extends through said first and second sealing segments, said mounting segment, and said pass-through segment;

said pass-through segment including a NVH flap that extends from said second end of said pass-through segment, said NVH flap being configured to abut the acoustic mat; and a grommet installation coupling including at least one mounting hole disposed in said flange that receives at least one mounting stud extending from the vehicle wall and at least one engagement member that engages said at least one mounting stud and applies an installation force to said flange to move said grommet longitudinally from a first installation position to a second installation position and push said NVH flap against the acoustic mat such that said NVH flap is deflected back toward said flange when said at least one engagement member moves said grommet to said second installation position.

2. The grommet as set forth in claim 1, wherein said at least one mounting stud is received in said at least one mounting hole and said wall-side face of said flange is longitudinally spaced from said vehicle wall when said grommet is located at said first installation position and wherein said at least one mounting stud extends through said at least one mounting hole and said wall-side face of said flange abuts said vehicle wall when said grommet advances to said second installation position.

3. The grommet as set forth in claim 2, wherein said flange and said NVH flap are spaced by a predetermined distance that is greater than a distance measured between the vehicle wall and the acoustic mat such that said NVH flap is substantially perpendicular to a longitudinal axis of said grommet when said grommet is located at said first installation position and such that said NVH flap is pushed back toward said flange at a predetermined acute angle when said grommet advances to said second installation position.

4. The grommet as set forth in claim 1, wherein said first and second sealing segments and said pass-through segment, including said NVH flap, are made of a resilient material and said flange of said mounting segment of said grommet is made of a thermoplastic material.

5. The grommet as set forth in claim 4, wherein said at least one mounting hole is defined by a ferrule disposed within said flange.

6. The grommet as set forth in claim 1, wherein said mounting segment and said pass-through segment both have a circular shaped cross-section.

7. The grommet as set forth in claim 1, wherein said mounting segment and said pass-through segment both have a D-shaped cross-section.

8. The grommet as set forth in claim 1, wherein said flange extends between a base and a periphery and is substantially transverse to a longitudinal axis of said grommet and wherein said pass-through segment includes an intermediate wall that extends from said base of said flange to said NVH flap.

9. A pass-through grommet assembly for installation in a vehicle, comprising:
a vehicle wall defining a wall opening;
an acoustic mat disposed along and at least partially covering said vehicle wall;
said acoustic mat including a barrier layer that has a wall-side surface and a barrier layer opening, said wall-side surface of said barrier layer facing said vehicle wall;
a grommet including a mounting segment, a pass-through segment, a first sealing segment, a second sealing segment, an internal cavity, and a longitudinal axis;
said mounting segment including a flange that has a wall-side face facing said vehicle wall, said flange being larger than said wall opening;
said pass-through segment having a first end disposed adjacent to said flange and a second end that is disposed adjacent to said second sealing segment and that is sized to pass through said wall opening;
said pass-through segment including a NVH flap that extends from said second end of said pass-through segment, said NVH flap being larger than said barrier layer opening; and
a grommet installation coupling including at least one mounting stud extending from said vehicle wall, at least one mounting hole disposed in said flange that receives said at least one mounting stud, and at least one engagement member that engages said at least one mounting stud and applies an installation force to said flange to move said grommet longitudinally relative to said vehicle wall and said acoustic mat from a first installation position to a second installation position and push said NVH flap against said wall-side surface of said barrier layer such that said NVH flap is deflected back toward said flange when said at least one engagement member moves said grommet to said second installation position.

10. The pass-through grommet assembly as set forth in claim 9, wherein said at least one mounting stud is received in said at least one mounting hole and said wall-side face of said flange is longitudinally spaced from said vehicle wall when said grommet is located at said first installation position and wherein said at least one mounting stud extends through said at least one mounting hole and said wall-side face of said flange abuts said vehicle wall when said grommet advances to said second installation position.

11. The pass-through grommet assembly as set forth in claim 10, wherein said vehicle wall and said acoustic mat are longitudinally spaced by a first predetermined distance and said flange and said NVH flap are spaced by a second predetermined distance that is greater than said first predetermined distance such that said NVH flap is substantially perpendicular to said longitudinal axis when said grommet is located at said first installation position and is pushed back toward said flange at a predetermined acute angle when said grommet advances to said second installation position.

12. The pass-through grommet assembly as set forth in claim 9, further comprising:
an electrical wiring harness that extends through said internal cavity of said grommet.

13. The pass-through grommet assembly as set forth in claim 12, wherein said mounting segment of said grommet includes a wire tie mount disposed on said flange that receives a wire tie, said wire tie mount being positioned below said first sealing segment, and said wire tie retaining said electrical wiring harness to said wire tie mount such that said electrical wiring harness forms a drip loop after exiting said first sealing segment.

14. The pass-through grommet assembly as set forth in claim 12, wherein said first sealing segment of said grommet includes a tubular boot and a folded portion that connects said tubular boot to said mounting segment, said folded portion of said first sealing segment having a domed wall that has an S-shaped cross-section where said domed wall transitions to said tubular boot, and said tubular boot being sized to seal against said electrical wiring harness at a location where said electrical wiring harness exits said first sealing segment of said grommet.

15. The pass-through grommet assembly as set forth in claim 12, wherein said second sealing segment of said grommet includes a wire tape tab and a transitional wall that connects said wire tape tab to said pass-through segment, said wire tape tab being segmented by a plurality of slits, and said wire tape tab being sized to seal against said electrical wiring harness at a location where said electrical wiring harness exits said second sealing segment of said grommet.

16. The pass-through grommet assembly as set forth in claim 9, wherein said vehicle wall includes an interior side facing a passenger compartment of the vehicle and an exterior side facing an engine compartment of the vehicle and wherein said wall-side face of said flange abuts said exterior side of said vehicle wall when said grommet is advanced to said second installation position.

17. The pass-through grommet assembly as set forth in claim 16, wherein said acoustic mat includes a decoupler layer that is disposed between said wall-side surface of said barrier layer and said interior side of said vehicle wall, said decoupler layer having a decoupler layer opening that is larger than said NVH flap of said grommet and that receives said NVH flap when said grommet is advanced to said second installation position.

18. The pass-through grommet assembly as set forth in claim 9, wherein said at least one mounting stud is connected to said vehicle wall and has a threaded portion and wherein said at least one engagement member is a nut that is threadably received on said threaded portion of said at least one mounting stud.

19. The pass-through grommet assembly as set forth in claim 9, wherein said mounting segment of said grommet includes a sealing lip that extends outwardly from said wall-side face of said flange toward said NVH flap and contacts said vehicle wall around said wall opening when said grommet is advanced to said second installation position.

20. The pass-through grommet assembly as set forth in claim 9, wherein said grommet includes a secondary pass-through that is open to said second sealing segment and that extends through said pass-through segment into a nipple formed in and extending outwardly from said first sealing segment.

* * * * *